US012598166B2

(12) United States Patent

Rajaram

(10) Patent No.: US 12,598,166 B2

(45) Date of Patent: Apr. 7, 2026

(54) SYSTEMS AND METHODS FOR FACILITATING INGESTION OF ENCRYPTED COMMUNICATIONS RECEIVED ACROSS CLOUD COMPUTING NETWORKS

(71) Applicant: Capital One Services, LLC, McLean, VA (US)

(72) Inventor: Manikandan Rajaram, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 176 days.

(21) Appl. No.: 18/641,216

(22) Filed: Apr. 19, 2024

(65) Prior Publication Data

US 2025/0330449 A1 Oct. 23, 2025

(51) Int. Cl.
| | |
|---|---|
| *H04L 9/40* | (2022.01) |
| *H04L 9/08* | (2006.01) |
| *H04L 9/30* | (2006.01) |

(52) U.S. Cl.
CPC ........ *H04L 63/0428* (2013.01); *H04L 9/0861* (2013.01); *H04L 9/30* (2013.01)

(58) Field of Classification Search
CPC ...... H04L 9/0861; H04L 9/30; H04L 63/0428
USPC ........................................................ 713/160
See application file for complete search history.

(56) References Cited

U.S. PATENT DOCUMENTS

| | | | | |
|---|---|---|---|---|
| 8,782,408 | B2 * | 7/2014 | Fielder ................. | H04L 63/065 |
| | | | | 713/168 |
| 9,762,553 | B2 * | 9/2017 | Ford ..................... | G06F 21/602 |
| 10,020,936 | B1 * | 7/2018 | Ghetti .................. | H04L 9/0861 |
| 10,033,702 | B2 * | 7/2018 | Ford ..................... | G06F 21/64 |
| 10,114,966 | B2 * | 10/2018 | Narayanaswamy ........................ | |
| | | | | H04L 63/1458 |
| 10,454,915 | B2 * | 10/2019 | Mohamad Abdul ........................ | |
| | | | | H04L 9/3271 |
| 11,736,275 | B2 * | 8/2023 | Katiyar ................. | H04L 9/0866 |
| | | | | 713/156 |
| 2005/0226424 | A1 * | 10/2005 | Takata ................ | H04L 63/0428 |
| | | | | 380/279 |
| 2008/0267395 | A1 * | 10/2008 | Deishi .................. | H04L 63/065 |
| | | | | 380/44 |
| 2016/0127331 | A1 * | 5/2016 | Liu ........................ | H04L 63/061 |
| | | | | 713/171 |
| 2025/0133120 | A1 * | 4/2025 | Valek .................. | H04L 63/1433 |

* cited by examiner

*Primary Examiner* — Amare F Tabor

(74) *Attorney, Agent, or Firm* — Foley & Lardner LLP

(57) ABSTRACT

Systems and methods for a document management system that uses a routing logic for ingesting encrypted communications received across the cloud computing network. By allowing ingested communications to be encrypted, the document management system does not subject the communications to the aforementioned vulnerabilities. Furthermore, using its routing logic, the system enables the document management system to maintain its functionality.

20 Claims, 4 Drawing Sheets

400

Receive communication

402

Direct communication to entitlement router

404

Determine tenant of communication

406

Store the communication based on tenant

408

Provide a storage reference to the communication

410

SYSTEMS AND METHODS FOR FACILITATING INGESTION OF ENCRYPTED COMMUNICATIONS RECEIVED ACROSS CLOUD COMPUTING NETWORKS

BACKGROUND

A Document Management System (DMS) is a software solution designed to store, manage, and track electronic documents and images of paper-based information captured through the use of a document scanner. DMS systems help organizations manage their documents and digital files more efficiently, providing a structured way to organize, secure, capture, digitize, tag, approve, and complete tasks with your business files. DMS plays a pivotal role in cloud networking environments by enhancing efficiency, collaboration, and accessibility of documents across an organization.

With a cloud-based DMS, documents and files are accessible from anywhere in the world at any time. This global accessibility is crucial for organizations with remote teams or those that operate in multiple locations, as it ensures all employees have access to the necessary documents without the need for physical storage or in-house servers. Cloud-based DMS solutions offer scalable storage options, allowing organizations to easily adjust their storage needs based on the volume of documents. This flexibility is particularly useful for growing businesses or those with fluctuating document management requirements. Deploying a DMS in the cloud can reduce the overhead costs associated with maintaining physical servers, IT infrastructure, and dedicated IT staff for document management. Cloud services typically operate on a subscription model, which can be more cost-effective and predictable for budgeting purposes. Finally, cloud providers often implement robust security measures, including data encryption, secure data centers, and compliance with various regulatory standards (such as GDPR, HIPAA, etc.). A cloud-based DMS leverages these security features, providing a secure environment for storing and managing sensitive documents and ensuring compliance with legal and industry standards.

SUMMARY

However, the reliance on cloud providers, and their security measures, for protecting network communication has a fundamental flaw. Specifically, network communications to the DMS lack the security protections prior to being ingested by the cloud providers API (application programming interface). The DMS requires access to unencrypted documents for several reasons, each related to the functionality and efficiency of managing, processing, and retrieving information. For example, for a DMS to effectively index the content of documents, it needs to be able to read and understand that content as the content is received. Indexing allows for quick and efficient search capabilities within the system, enabling users to find documents based on their content rather than just file names or metadata. Encryption obscures the content, making it unreadable without the appropriate decryption key.

This technical problem is further problematic if the DMS includes features for version control and collaboration, allowing multiple users to access, edit, and comment on documents. This is problematic as the system must be able to present the documents' content to users, which would not be possible if the documents were encrypted. Additionally, in many instances, determining a version of a document and/or allowing users to view the documents within the DMS interface requires rendering the content (at least in a previewed version). Encrypted documents cannot be directly rendered without first being decrypted; thus, preventing the documents being previewed.

Accordingly, to enable the capabilities of the DMS, communications to the DMS need to remain unencrypted prior to ingestion by the DMS. Unfortunately, this causes the communications to be vulnerable to malicious actors during that time period.

In view of these technical problems, systems and methods are described herein for novel uses and/or improvements to document management systems across cloud computing networks. As one example, systems and methods are described herein for a document management system that uses a novel routing logic for ingesting encrypted communications received across the cloud computing network. By allowing ingested communications to be encrypted, the document management system does not subject the communications to the aforementioned vulnerabilities. Furthermore, using its novel routing logic, the system enables the document management system to maintain its functionality.

In particular, the routing logic ingests encrypted communications (e.g., a client request) based on a tenant corresponding to the encrypted communication and an entitlement corresponding to the tenant. For example, the tenant may encrypt a communication using ephemeral keys before calling the upload service API of the document management system. Based on the routing logic, the system sends the encrypted communication to an entitlement router. The entitlement router determines a tenant that has the required entitlements, and then routes the communication to a compute instance container corresponding to the tenant. The compute instance container, which is selected from a plurality of compute instance containers based on it corresponding to the determined tenant, has permissions to retrieve the encrypted communication and decrypt it. The decrypted communication may then be processed by the document management system. For example, the system may upload the decrypted communication to a public storage resource corresponding to a specific tenant, where the decrypted communication may be encrypted using the keys owned by the tenant, which restricts download and decryption for everyone except the tenant.

In some aspects, systems and methods for facilitating ingestion of encrypted communications received across cloud computing networks with multi-tenancy architectures at document management systems featuring versioning capabilities are described. For example, the system may receive a first encrypted communication, wherein the first encrypted communication was encrypted using a first ephemeral key for a first tenant prior to an upload service application programming interface of a document management system being called. The system may process, using a routing logic, the first encrypted communication by directing the first encrypted communication to an entitlement router, wherein the routing logic comprises a rule set for ingesting communications into the document management system. The system may process, at the entitlement router, the first encrypted communication to determine that the first communication corresponds to the first tenant. The system may store the first decrypted communication at a first public cloud storage resource corresponding to the first tenant, wherein the first decrypted communication is re-encrypted using an encryption native to the document management system. The system may provide a first reference to the first decrypted communication at the first public cloud storage resource to the document management system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
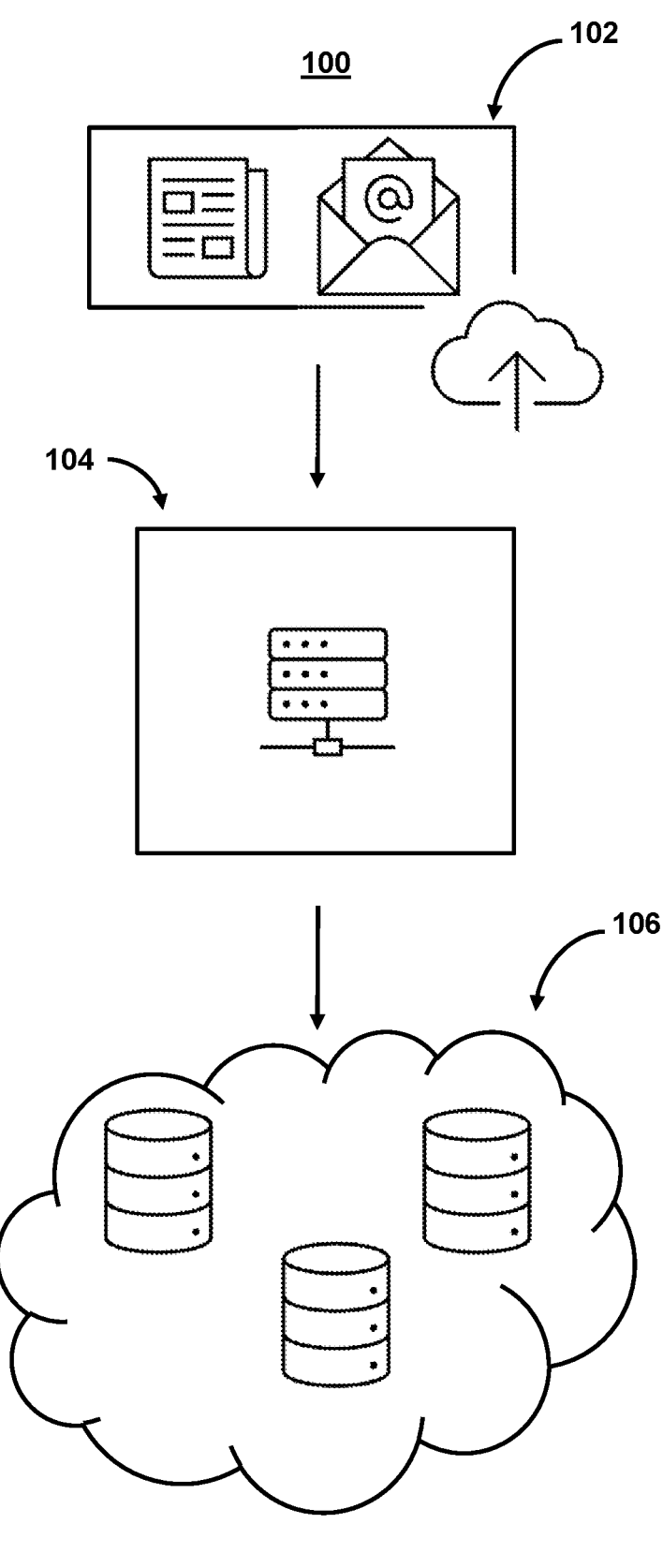
FIG. 1 shows an illustrative diagram for facilitating ingestion of encrypted communications received across cloud computing networks, in accordance with one or more embodiments.

FIG. 1 shows an illustrative diagram for facilitating ingestion of encrypted communications received across cloud computing networks. For example, FIG. 1 shows system 100. System 100 may be used to facilitate ingestion of encrypted communications received across cloud computing networks with multi-tenancy architectures at document management systems featuring versioning capabilities.

As described herein, a cloud computing network may refer to the interconnected infrastructure that supports the delivery of cloud computing services. This network may span a vast array of physical and virtual resources, including data centers, servers, storage systems, and networking equipment, all working together to provide scalable and flexible computing services over the internet.

In some embodiments, system 100 may describe a multi-tenancy architecture. Multi-tenancy architecture is a software architecture pattern where a single instance of a software application serves multiple customers, each known as a tenant. This architecture is prevalent in cloud computing, particularly in Software as a Service (SaaS) applications. Each tenant's data is isolated and remains invisible to other tenants, yet the application itself is shared. The core infrastructure, including hardware and software, is shared among all tenants. This sharing drives cost efficiency and simplifies maintenance since updates to the application automatically apply to every tenant. Although the infrastructure is shared, the data for each tenant is kept isolated. This isolation can be achieved through various database strategies, such as having separate schemas for each tenant, shared databases with tenant-specific tables, or using tenant-specific columns in shared tables.

System 100 may use one or more types of multi-tenancy. For example, system 100 may use a database per tenant structure, where each tenant has its own database, ensuring data isolation at the database level. This is simpler to manage regarding data security but can be resource-intensive as the number of tenants grows. System 100 may also use a shared database, separate schemas structure, where all tenants share a single database, but each tenant has its own schema. This balances resource use efficiently while maintaining a good level of data isolation. In yet another example, system 100 may use a shared database, shared schema structure, where the most complex in terms of data isolation, this approach has all tenants sharing a single database and even the same tables. Data for each tenant is differentiated by specific tenant ID columns in each table.

System 100 may ingest one or more communications (e.g., communication 102). Communication 102 may comprise any type of content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

Communication 102 may comprise an encrypted communication. For example, system 100 may show a first encrypted communication. An encrypted communication may refer to the practice of encoding messages or information in such a way that only authorized parties can access and read them. This may involve transforming readable data, known as plaintext, into an unreadable format known as ciphertext, using a cryptographic algorithm and a key. The encrypted communication may use an encryption algorithm, which is a set of mathematical rules (algorithm) that transforms plaintext into ciphertext. Common encryption algorithms include AES (Advanced Encryption Standard), RSA (Rivest-Shamir-Adleman), and ECC (Elliptic Curve Cryptography).

The encryption algorithm may allow an encrypted communication to be decrypted using a key. Encryption keys are crucial to the encryption and decryption processes. In symmetric-key encryption, the same key is used for both encrypting and decrypting data. In asymmetric-key encryption, two different keys are used—a public key for encryption and a private key for decryption. Symmetric encryption is a type of encryption that uses a single key to both encrypt and decrypt data. It is fast and efficient, making it suitable for scenarios where large amounts of data need to be encrypted, such as file storage or database encryption. Asymmetric encryption (or public-key cryptography) involves two keys—one public and one private. The public key is shared openly, allowing anyone to encrypt messages. However, decryption can only be performed with the private key, which is kept secret. This type of encryption is commonly used in digital signatures and secure key exchanges.

In some embodiments, encryption may involve using an encryption key to encrypt the plaintext message into ciphertext. The encrypted message (ciphertext) may then be transmitted over a communication channel. Even if intercepted, the ciphertext should be unreadable without the decryption key. The recipient may use a decryption key (which might be the same as the encryption key in symmetric encryption or a different one in asymmetric encryption) to convert the ciphertext back into plaintext.

In some embodiments, communication 102 may be encrypted using a first ephemeral key. Ephemeral keys may be temporary encryption keys used only once for a session or transaction, offering an added layer of security because even if the key is compromised, it only affects a single transaction. The process may involve generating the key, encrypting the document, and then safely transmitting the encrypted document and possibly the key or a way to retrieve the key securely. For example, the tenant may generate an ephemeral key. This key may be a symmetric key used for encrypting and decrypting the document. Symmetric encryption algorithms such as AES (Advanced Encryption Standard) may be selected because of their balance between security and performance. For example, using the ephemeral key, the tenant encrypts the document. The specific method of encryption depends on the algorithm and key chosen. If using AES, you would apply an encryption mode (like CBC or GCM) and potentially a padding scheme if necessary.

In some embodiments, the first ephemeral key may be for a first tenant and/or may be encrypted prior to an upload service application programming interface of a document management system being called. An upload service Application Programming Interface (API) of a document management system is a set of protocols and tools that allow developers to programmatically upload documents and files to a document management system (DMS). This API essentially acts as a bridge between the user or client applications and the backend document management systems, facilitating the secure and efficient transfer of documents into the system.

In some embodiments, system 100 may call the upload service application programming interface of the document management system. For example, a user or application may authenticate itself using the provided methods to gain access to the API functionalities. System 100 may then prepare communication 102, which includes setting any necessary metadata and formatting the document as required by the API. An HTTP request is sent to the API endpoint designed for uploads. This request includes communication 102 (e.g., a document file), any necessary metadata, and possibly an indication of where in the DMS the document should be stored. After the document is uploaded, the server processes the request and returns a response. This response could indicate success, failure, or provide further instructions or information (e.g., a URL where the uploaded document can now be accessed).

Communication 102 may be received by entitlement router 104. For example, system 100 may process, using a routing logic, communication 102 by directing it to entitlement router 104, wherein the routing logic comprises a rule set for ingesting communications into the document management system. For example, in a multi-tenant environment, especially within a document management system (DMS), the entitlement router may play a crucial role in ensuring that communications (such as document uploads, requests, or updates) are directed to the appropriate tenant based on specific routing logic. This logic is typically defined in a rule set that determines how communications are processed and directed within the system. For example, system 100 may process, at entitlement router 104, communication 102 to determine that the first communication corresponds to a first tenant.

System 100 may begin the upload process when the system receives communication 102, which could be a document upload request, a query for a document, or another type of message. Communication 102 may contain metadata (e.g., a tenant identifier) that identifies the tenant or includes data from which the tenant identity can be inferred. Entitlement router 104 examines the incoming communication to extract tenant-specific identifiers. These identifiers might be explicitly provided (e.g., a tenant ID in the request header or body) or derived from other attributes like the user's login credentials, domain information, or API keys. Once the tenant identifier is determined, entitlement router 104 applies the predefined routing logic to decide the target destination within the multi-tenant architecture.

After system 100 decrypts communication 102, system 100 may store communication 102 at one or more of resources 106. For example, system 100 may store the decrypted communication at a first public cloud storage resource corresponding to the first tenant, wherein the first decrypted communication is re-encrypted using an encryption native to the document management system. For example, native encryption in the context of a document management system may refer to the built-in capability of the service to encrypt documents and data at rest and possibly in transit, using its own integrated encryption mechanisms. This feature is essential for ensuring the security and privacy of the documents managed within the service, particularly in compliance with regulatory requirements and to protect sensitive information from unauthorized access.

System 100 may provide a first reference to decrypted communication 102 at the first public cloud storage resource to the document management system. For example, the system may generate a reference to this data. This reference may comprise a unique URL or URI (Uniform Resource Identifier) that points to the location of the decrypted communication in the cloud storage. The reference generation process might involve creating a secure link. The link may be generated in such a way that it includes security measures to prevent unauthorized access. This can involve tokens, encrypted parameters, or session-limited access to ensure that only authorized users can use the link to access the data. The reference generation process may also involve expiration and policies. For example, the link can have an expiration time after which it cannot be used, or policies that restrict how the link can be used (e.g., view-only, no-download).

System 100 may also allow for a communication (e.g., a stored document) to be retrieved and/or generated for display on a user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

For example, system 100 may receive, from a second remote device, a request to access the first decrypted communication using the first reference and in response to receiving the request, determine whether the second remote device corresponds to the first tenant. For example, a request may include a reference (e.g., a URL or token) to the decrypted communication that the user wishes to access. This reference typically encapsulates necessary identifiers that link it to specific data within the cloud environment. Upon receiving the request, system 100 extracts information from the reference provided. This may include a document identifier, which specific document or communication is being requested. The information may also include a security token or parameters, which might be included in the reference to provide additional security and context.

System 100 may check if the remote device belongs to the first tenant (the tenant that owns or has rights to the decrypted communication). This can involve checking the tenant ID associated with the user or device credentials. System 100 may review access control policies to see if the device's credentials match the required permissions for accessing the decrypted communication. Before any action is taken based on the tenant identifier, system 100 may authenticate the request to verify the identity of the requester. This may involve validating security tokens (e.g., ensuring that any provided security tokens are valid and have not been tampered with) and verifying credentials (e.g., checking usernames, passwords, API keys, or other credentials provided in the request). Once the request is authenticated, system 100 may proceed to verify that the tenant identifier corresponds to a legitimate and active tenant within the system. This may involve a database or directory lookup. For example, the system queries an internal database or directory service to confirm that the tenant identifier matches an existing tenant record. This record includes details about the tenant's status, permissions, and other relevant metadata. System 100 may also perform a tenant status check. For example, system 100 may check the status of the tenant to ensure they are active and in good standing. This may include checking for any suspension, expiration, or specific conditions that might affect their access rights. If the tenant identifier is verified, system 100 may then perform additional access control checks to determine what resources or data the tenant can access based on the request. This may involve role-based access control (RBAC), where system 100 determines if the roles or privileges assigned to the user making the request allow for the requested operation within the tenant's scope. This may also involve access control lists (ACL) by checking detailed access control lists that might restrict or allow certain actions at a granular level.

In some embodiments, determining whether the second remote device corresponds to the first tenant may comprise the system receiving a tenant identifier in the request and determining that the tenant identifier corresponds to the first tenant. This identifier may be part of the request headers, query parameters, or within the body of the request, depending on the API design and security practices of the system. In many architectures, an API gateway handles initial request processing and can parse headers or tokens to extract tenant information. If the request involves a security token (like JWT), the authentication service might decode this token to extract tenant information as part of the authentication process.

System 100 may, in response to determining that the second remote device corresponds to the first tenant, remove the encryption native to the document management system. The system may then generate a second encrypted communication, based on the first decrypted communication, using a second ephemeral key for the first tenant. The system may then transmit the second encrypted communication to the second remote device. The second remote device may then use its private key to decrypt the second encrypted communication.

Figure 2:
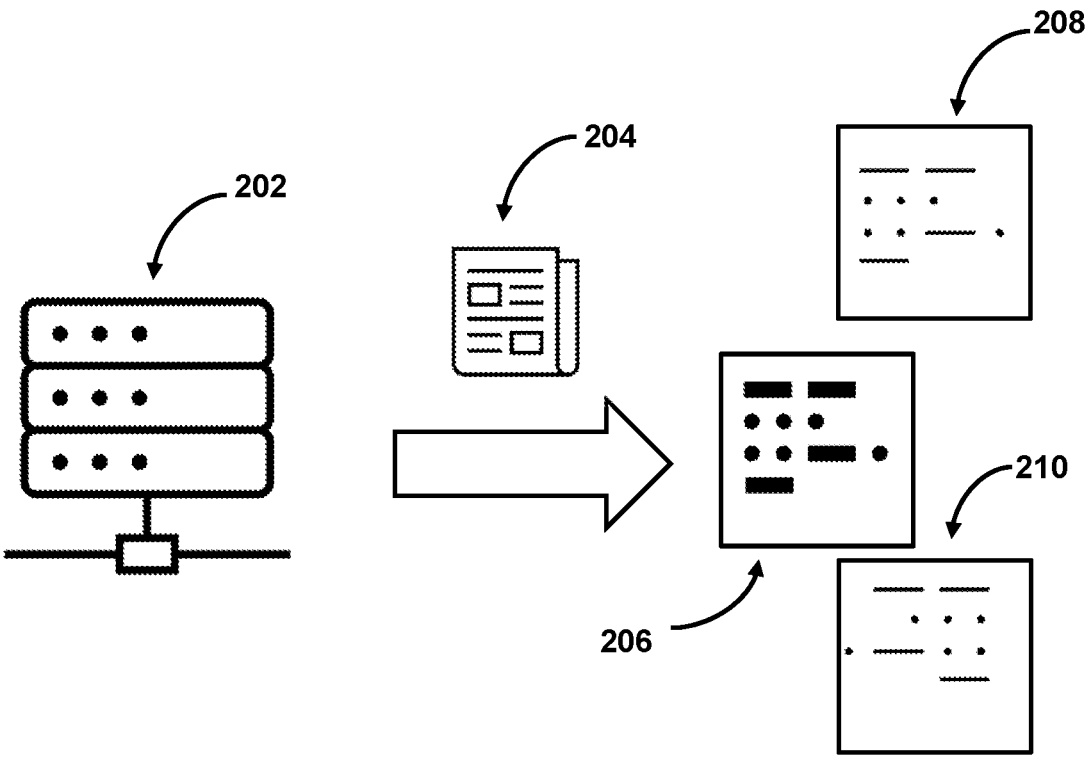
FIG. 2 shows an illustrative diagram for use of an entitlement router, in accordance with one or more embodiments.

FIG. 2 shows an illustrative diagram for use of an entitlement router, in accordance with one or more embodiments. For example, FIG. 2 may show operations performed by an entitlement router (e.g., entitlement router 104) when facilitating ingestion of encrypted communications received across cloud computing networks.

As shown in FIG. 2, entitlement router 202 may determine which tenant (or compute instance corresponding to a tenant) to use to store a received communication (e.g., communication 204). For example, entitlement router 202 may select one or more of tenants 206, 208, and/or 210 for decrypting and storing communication 204.

Entitlement router 202 may examine the incoming communication to extract tenant-specific identifiers. These identifiers might be explicitly provided (e.g., a tenant ID in the request header or body) or derived from other attributes like the user's login credentials, domain information, or API keys. Once the tenant identifier is determined, entitlement router 104 applies the predefined routing logic to decide the target destination within the multi-tenant architecture.

In some embodiments, the routing logic is part of a rule set that includes criteria such as Tenant ID matching (e.g., directing the communication to data stores or processing queues specific to the extracted tenant ID), type of request (e.g., differentiating actions based on the type of communication, such as uploads, edits, or retrieval requests), and/or security and permissions checks (e.g., verifying if the sender of the communication has the necessary permissions for the requested operation within the tenant's environment). Based on the outcome of the routing logic, communication 204 is forwarded to the appropriate processing node, queue, or data store that is designated for the identified tenant. This may involve directing the document to a tenant-specific database or storage location, queuing the request for further action in tenant-specific processing queues, and/or invoking tenant-specific workflows or processes. Upon reaching the correct destination, communication 204 is processed according to the tenant's specific configurations and rules. This could involve storing a document, executing a workflow, or retrieving and sending data back to the user.

In some embodiments, the system may use a compute instance container corresponding to the first tenant. As described herein, a compute instance container may refer to a containerized environment running on a virtual or physical compute instance. This term integrates concepts from containerization technology and cloud computing. A compute instance may refer to a virtual machine (VM) or a physical server that provides computational resources, such as CPU, memory, and storage, required to run applications. In cloud environments, these instances are offered as virtual servers that you can provision and manage via cloud service providers like AWS, Google Cloud Platform, or Microsoft Azure. These instances are highly scalable, meaning they can be adjusted in size and capacity according to the needs of the applications they host. A container, on the other hand, is a lightweight, executable package that includes everything needed to run a piece of software, including the code, runtime, libraries, and environment variables. Containers are isolated from each other and the host system but share the OS kernel of the host. This makes them more efficient and faster to start than traditional virtual machines that need to run their operating systems. In some embodiments, a compute instance container may mean a container that is deployed within a compute instance. This setup combines the scalability and flexibility of virtual machines with the efficiency and speed of containerization.

Entitlement router 202 may select a first compute instance container from a plurality of compute instance containers based on the first tenant. For example, the system may select a specific compute instance container from a group of containers based on a tenant's requirements involving a series of orchestrated steps that integrate concepts of multi-tenancy, container orchestration, and resource allocation. Entitlement router 202 may then decrypt, at the first compute instance container, communication 204 based on first permissions of the first tenant to generate a first decrypted communication. For example, upon receiving the encrypted document and the encrypted ephemeral key, the system uses the private key corresponding to the tenant to decrypt the document. Before attempting decryption, entitlement router 202 first needs to authenticate the source of the communication to verify its integrity and origin. Following authentication, entitlement router 202 checks the authorization based on the tenant's permissions, which may involve identifying the tenant (e.g., determining which tenant sent the request or for whom the request was intended) and verifying permissions (e.g., checking if the identified tenant has the necessary permissions to access or decrypt the communication). This is typically managed through an Access Control List (ACL) or a similar permissions management system that specifies which actions a tenant can perform.

Figure 3:
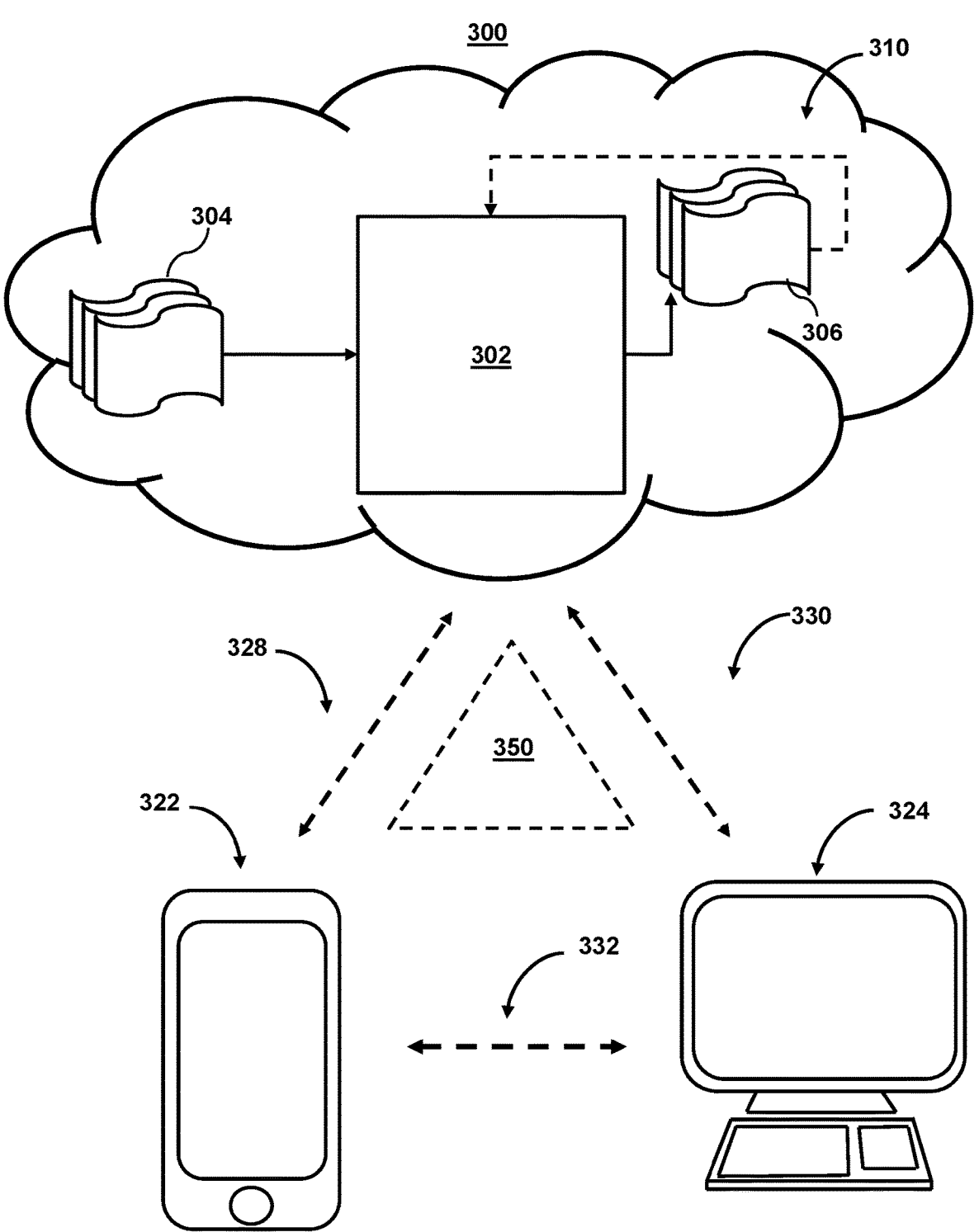
FIG. 3 shows illustrative components for a system used to facilitate ingestion of encrypted communications, in accordance with one or more embodiments.

FIG. 3 shows illustrative components for a system used to facilitate ingestion of encrypted communications, in accordance with one or more embodiments. For example, FIG. 3 may show illustrative components for facilitating ingestion of encrypted communications received across cloud computing networks with multi-tenancy architectures at document management systems featuring versioning capabilities. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a tenant for a given communication).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a tenant for a given communication).

In some embodiments, the model (e.g., model 302) may automatically perform actions based on outputs 306. In some embodiments, the model (e.g., model 302) may not perform any actions. The output of the model (e.g., model 302) may be used to select a tenant.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
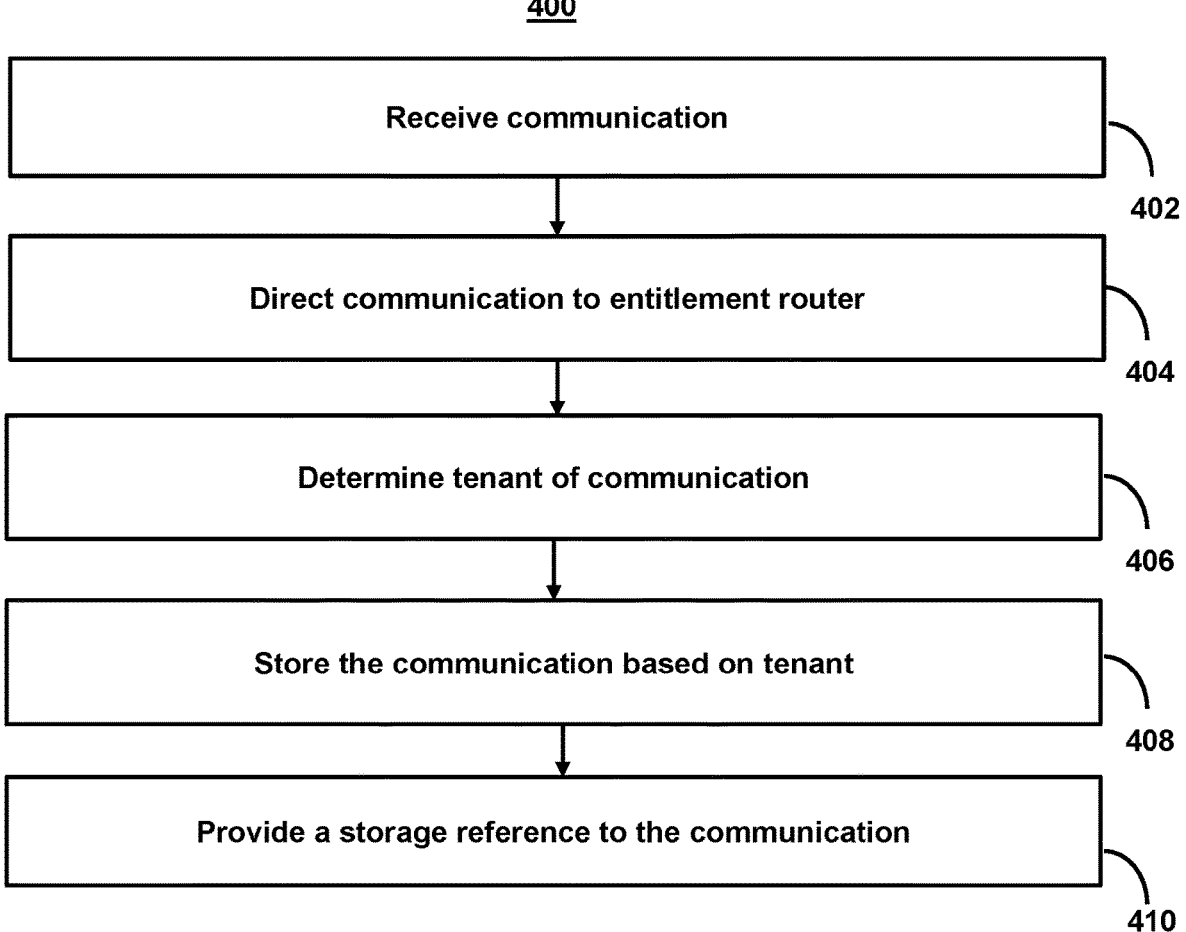
FIG. 4 shows a flowchart of the steps involved in facilitating ingestion of encrypted communications received across cloud computing networks, in accordance with one or more embodiments.

FIG. 4 shows a flowchart of the steps involved in facilitating ingestion of encrypted communications received across cloud computing networks, in accordance with one or more embodiments. For example, the system may use process 400 (e.g., as implemented on one or more system components described above) in order to facilitate ingestion of encrypted communications received across cloud computing networks with multi-tenancy architectures at document management systems featuring versioning capabilities.

At step 402, process 400 (e.g., using one or more components described above) receives a communication. For example, the system may receive a first encrypted communication, wherein the first encrypted communication was encrypted using a first ephemeral key for a first tenant prior to an upload service application programming interface of a document management system being called.

In some embodiments, receiving the first encrypted communication may comprise the system receiving a notification of delivery of a first communication from a first remote device; and, in response to receiving the notification, initiating a device session between the entitlement router and the first remote device. For example, the system may receive a notification indicating the successful delivery of a communication from a remote device. This notification can be transmitted through various mechanisms, such as webhooks that send signals to a server's URL endpoint, RESTful API calls made by the remote device, or messages placed in a messaging queue that the server checks periodically. Upon receiving this notification, the server first validates it to ensure its authenticity. This validation may involve checking the source of the notification, verifying authentication tokens or signatures, and confirming that the message contents match the expected format and pertain to a legitimate communication event. Once the notification is validated, the next step involves initiating a session between the entitlement router and the remote device. The entitlement router plays a crucial role here, managing rights and permissions to ensure that only authorized devices can establish sessions. The router sends a session initiation request to the remote device, which includes a session identifier and necessary security credentials. The remote device responds with its authentication details, such as user credentials or security tokens. The entitlement router verifies these credentials against its policies to authorize the connection. Upon successful authentication and authorization, a secure communication channel is established using protocols like TLS (Transport Layer Security), ensuring all data exchanged during the session is encrypted and secure. The router then confirms the session establishment to the remote device, enabling secure communication and data exchange as per the device's permissions.

In some embodiments, initiating the device session between the entitlement router and the first remote device may comprise generating a temporary key for encrypting the first communication and transmitting the temporary key to the first remote device. For example, using the ephemeral key, the remote device may encrypt a document. The specific method of encryption depends on the algorithm and key chosen. If using AES, you would apply an encryption mode (like CBC or GCM) and potentially a padding scheme if necessary. In some embodiments, a remote device may upload an encrypted document through the document upload service API. The upload may include the encrypted document and the encrypted ephemeral key (or a reference to it if the key itself is not transmitted directly).

In some embodiments, generating the temporary key for encrypting the first communication may comprise generating a public key for encrypting the first communication to generate the first encrypted communication and generating a private key for decrypting the first encrypted communication. For example, the ephemeral key, if it is a symmetric key, may also be securely transferred to the remote device or stored in a way that the remote device can retrieve it when needed. This is often done by encrypting the ephemeral key with the remote device's public key, ensuring that only the remote device can decrypt it with its private key. Upon receiving the encrypted document and the encrypted ephemeral key, the system may use its private key to decrypt the ephemeral key. It can then use the ephemeral key to decrypt the document.

In some embodiments, the system may use asymmetric cryptography, involving a pair of mathematically linked keys: a public key for encryption and a private key for decryption. The generation of these keys starts with a cryptographic algorithm, such as RSA or ECC (Elliptic Curve Cryptography). The choice of algorithm largely depends on the specific security requirements and operational efficiencies desired, with ECC often preferred for its strong security at shorter key lengths. The key generation process begins by using a high-quality random number generator (RNG) to ensure the robustness of the keys against cryptographic attacks. Once generated, the public key encrypts the plaintext data, transforming it into ciphertext. This encryption process includes data preparation, like padding, and the application of the public key via the chosen cryptographic protocol, resulting in encrypted data that can safely be transmitted over insecure channels. Upon receipt, the corresponding private key is used by the recipient to decrypt the ciphertext back into readable plaintext. For systems employing ephemeral keys, these keys are discarded after a single use, a practice known as perfect forward secrecy. This ensures that the compromise of a key after a session does not jeopardize the security of previous or future communications, maintaining stringent data protection even if a key is later compromised. This structured approach to key management and data encryption allows for the secure transmission of sensitive information over potentially insecure environments, safeguarding against eavesdropping and unauthorized access.

At step 404, process 400 (e.g., using one or more components described above) directs the communication to an entitlement router. For example, the system may process, using a routing logic, the first encrypted communication by directing the first encrypted communication to an entitlement router, wherein the routing logic comprises a rule set for ingesting communications into the document management system.

In some embodiments, the system may call the upload service application programming interface of the document management system and receive the routing logic in response to calling the upload service application programming interface. For example, when a system interacts with the upload service API of a document management system to submit a document and receive routing logic in response, the process may unfold through a series of coordinated steps designed to ensure secure and efficient handling of the data. Initially, the system initiates this interaction by making an API call, typically over HTTP or HTTPS, which includes necessary authentication details such as tokens or API keys. These credentials verify the identity of the caller and authorize the upload request, while accompanying metadata may describe the document's type, size, or specific handling instructions. Upon receipt of this API call, the document management system first authenticates the caller to confirm its identity and then checks for authorization to ensure the caller has the necessary permissions to execute the upload. Following successful verification, the service processes the upload request by analyzing the provided data and metadata to determine appropriate actions such as storage location or categorization. As part of this request processing, the service generates routing logic. This logic comprises a set of rules or policies that dictate subsequent handling of the uploaded document, including where it should be stored, who can access it, and any associated workflows or processing that should be triggered. This routing logic is then packaged into a response and sent back to the originating system, typically in formats like JSON or XML, detailing the instructions for further processing or management of the document. The system that initiated the request receives this routing logic and implements it according to the provided guidelines, effectively managing the document's placement, access, and any required processing as dictated by the logic. This structured communication via the API not only automates but also secures the document handling processes, ensuring that documents are managed in compliance with established organizational policies and standards. This methodical approach is essential for maintaining control and security over document management in large-scale or sensitive environments.

At step 406, process 400 (e.g., using one or more components described above) directs the communication to an entitlement router. For example, the system may process, at the entitlement router, the first encrypted communication to determine that the first encrypted communication corresponds to the first tenant.

In some embodiments, processing the first encrypted communication using the routing logic may comprise determining, by the routing logic, a tenant identifier transmitted with the first encrypted communication and determining to direct the first encrypted communication to the entitlement router based on the tenant identifier. For example, the system may receive an encrypted communication, as part of a broader communication or data management service. The encrypted communication may include a tenant identifier.

Upon receipt of the communication, the system utilizes its routing logic to analyze the included tenant identifier. This step is vital as it determines the correct routing path for the communication within the system's infrastructure. The routing logic, programmed into the system, is designed to parse the tenant identifier and ascertain which tenant the communication belongs to. After identifying the tenant, the system then determines the appropriate destination for the encrypted communication. Based on the recognized tenant identifier, the routing logic decides to direct the communication to the entitlement router. The entitlement router is a specialized component within the system tasked with managing and enforcing access controls and routing decisions based on tenant entitlements. It acts as a gatekeeper, ensuring that communications are only processed and accessed by authorized entities and according to each tenant's specific policies. This process of identifying the tenant and directing the communication through the entitlement router ensures that the system maintains robust security and compliance with data handling regulations. Each tenant's data is handled uniquely as dictated by their specific security requirements and operational needs, thereby safeguarding sensitive information and maintaining organizational integrity. This methodical approach to routing based on tenant identifiers allows for tailored data management, crucial in environments where multiple tenants coexist within the same system infrastructure.

At step 408, process 400 (e.g., using one or more components described above) stores the communication based on the tenant. For example, the system may store a first decrypted communication corresponding to the first encrypted communication at a first public cloud storage resource, wherein the first public cloud storage resource corresponds to the first tenant, and wherein the first decrypted communication is re-encrypted using an encryption native to the document management system.

In some embodiments, the system may select a first compute instance container from a plurality of compute instance container based on the first tenant and decrypt, at the first compute instance container, the first encrypted communication based on first permissions of the first tenant to generate the first decrypted communication. For example, when a request is made by the first tenant, the system begins by identifying the appropriate compute instance container from a pool of available containers. This selection is primarily based on the tenant's specific requirements and resource allocations, which are predefined in the system's configuration settings. Factors such as the current load, resource availability, and specific tenant-related policies (like data residency requirements or specific hardware dependencies) play crucial roles in this selection process. Once a suitable container is identified, it is earmarked for handling the tenant's request. Following the selection of the compute instance container, the system proceeds to decrypt the encrypted communication. This decryption process starts with the authentication of the tenant to ensure the request is legitimate. The system then checks the tenant's permissions, often managed through an Access Control List (ACL) or a Role-Based Access Control (RBAC) system, to confirm that the tenant has the necessary rights to access the encrypted communication. Upon successful verification, the decryption keys are retrieved, typically from a secure key management service that the system interacts with. These keys are closely guarded and are only made accessible to instances and tenants based on strict policy enforcement. The compute instance container, now equipped with the appropriate decryption keys and having confirmed the tenant's permissions, decrypts the encrypted communication. This process involves cryptographic operations that convert the encrypted data back into its original, plaintext format. The result is the first decrypted communication, ready for use by the tenant.

At step 410, process 400 (e.g., using one or more components described above) provides a storage reference to the communication. For example, the system may provide a first reference to the first decrypted communication at the first public cloud storage resource to the document management system. For example, the communication may be decrypted, either before upload or directly within the cloud environment, utilizing secure encryption key management practices to ensure the data's integrity and confidentiality. Once the communication is decrypted, it is stored in a designated area of the public cloud storage resource allocated for this purpose. The storage location is chosen based on factors such as data accessibility, compliance with data residency regulations, and security requirements. Following the storage of the decrypted communication, the system generates a unique reference or identifier for this particular piece of communication. This reference could be a URL, a URI, or another form of unique pointer that directly links to the location of the decrypted data within the cloud storage. The system then communicates this reference to the document management system. This is typically achieved through an API call where the reference is securely transmitted over encrypted channels to ensure that no unauthorized access occurs during transmission. The document management system, upon receiving this reference, uses it to access the decrypted communication. This access is managed through controlled permissions and authentication mechanisms to ensure that only authorized users or systems can retrieve the data. This method of providing a reference to decrypted data ensures that the actual data transmission over the network is minimized, enhancing security and efficiency, particularly in environments where large volumes of sensitive data are handled regularly. This approach not only secures the data but also leverages the scalability and reliability of cloud storage solutions, optimizing data management and access in a document management context.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of facilitating ingestion of encrypted communications received across cloud computing networks with multi-tenancy architectures at document management systems featuring versioning capabilities.

2. The method of the preceding embodiment, the method comprising: receiving a first encrypted communication, wherein the first encrypted communication was encrypted using a first ephemeral key for a first tenant prior to an upload service application programming interface of a document management system being called; processing, using a routing logic, the first encrypted communication by directing the first encrypted communication to an entitlement router, wherein the routing logic comprises a rule set for ingesting communications into the document management system; processing, at the entitlement router, the first encrypted communication to determine that the first communication corresponds to the first tenant; storing the first decrypted communication at a first public cloud storage resource corresponding to the first tenant, wherein the first decrypted communication is re-encrypted using an encryption native to the document management system; and providing a first reference to the first decrypted communication at the first public cloud storage resource to the document management system.

3. The method of any one of the preceding embodiments, further comprising: selecting a first compute instance container from a plurality of compute instance container based on the first tenant; and decrypting, at the first compute instance container, the first encrypted communication based on first permissions of the first tenant to generate a first decrypted communication.

4. The method of any one of the preceding embodiments, wherein receiving the first encrypted communication further comprises: receiving a notification of delivery of a first communication from a first remote device; and in response to receiving the notification, initiating a device session between the entitlement router and the first remote device.

5. The method of any one of the preceding embodiments, wherein initiating the device session between the entitlement router and the first remote device further comprises: generating a temporary key for encrypting the first communication; and transmitting the temporary key to the first remote device.

6. The method of any one of the preceding embodiments, wherein generating the temporary key for encrypting the first communication further comprises: generating a public key for encrypting the first communication to generate the first encrypted communication; and generating a private key for decrypting the first encrypted communication.

7. The method of any one of the preceding embodiments, wherein generating the temporary key for encrypting the first communication further comprises: retrieving a public key corresponding to the first remote device; encrypting the temporary key using the public key to generate an encrypted temporary key; and transmitting the encrypted temporary key to the first remote device, wherein the encrypted temporary key is decryptable using a private key corresponding to the first remote device.

8. The method of any one of the preceding embodiments, further comprising: calling the upload service application programming interface of the document management system; and receiving the routing logic in response to calling the upload service application programming interface.

9. The method of any one of the preceding embodiments, wherein processing the first encrypted communication using the routing logic further comprises: determining, by the routing logic, a tenant identifier transmitted with the first encrypted communication; and determining to direct the first encrypted communication to the entitlement router based on the tenant identifier.

10. The method of any one of the preceding embodiments, wherein processing, at the entitlement router, the first communication to determine that the first communication corresponds to the first tenant further comprises: comparing the tenant identifier to a plurality of tenant identifiers; and selecting the first tenant based on comparing the tenant identifier to the plurality of tenant identifiers.

11. The method of any one of the preceding embodiments, further comprising: receiving, from a second remote device, a request to access the first decrypted communication using the first reference; and in response to receiving the request, determining whether the second remote device corresponds to the first tenant.

12. The method of any one of the preceding embodiments, wherein determining whether the second remote device corresponds to the first tenant further comprises: receiving a tenant identifier in the request; and determining that the tenant identifier corresponds to the first tenant.

13. The method of any one of the preceding embodiments, further comprising: in response to determining that the second remote device corresponds to the first tenant, removing the encryption native to the document management system; generating a second encrypted communication, based on the first decrypted communication, using a second ephemeral key for the first tenant; and transmitting the second encrypted communication to the second remote device.

14. One or more non-transitory, computer-readable mediums storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for facilitating ingestion of encrypted communications received across cloud computing networks with multi-tenancy architectures at document management systems featuring versioning capabilities, the system comprising:

one or more processors; and one or more non-transitory, computer readable mediums comprising instructions recorded thereon that when executed by the one or more processors cause operations comprising:

receiving a first encrypted communication, wherein the first encrypted communication was encrypted using a first ephemeral key for a first tenant prior to an upload service application programming interface of a document management system being called;

calling the upload service application programming interface of the document management system;

processing, using a routing logic, the first encrypted communication by directing the first encrypted communication to an entitlement router, wherein the routing logic comprises a rule set for ingesting communications into the document management system;

processing, at the entitlement router, the first encrypted communication to determine that the first encrypted communication corresponds to the first tenant;

selecting a first compute instance container from a plurality of compute instance container based on the first tenant;

decrypting, at the first compute instance container, the first encrypted communication based on first permissions of the first tenant to generate a first decrypted communication;

storing the first decrypted communication at a first public cloud storage resource corresponding to the first tenant, wherein the first decrypted communication is re-encrypted using an encryption native to the document management system; and providing a first reference to the first decrypted communication at the first public cloud storage resource to the document management system.

2. A method of facilitating ingestion of encrypted communications received across cloud computing networks with multi-tenancy architectures at document management systems featuring versioning capabilities, the method comprising:

receiving a first encrypted communication, wherein the first encrypted communication was encrypted using a first ephemeral key for a first tenant prior to an upload service application programming interface of a document management system being called;

processing, using a routing logic, the first encrypted communication by directing the first encrypted communication to an entitlement router, wherein the routing logic comprises a rule set for ingesting communications into the document management system;

processing, at the entitlement router, the first encrypted communication to determine that the first encrypted communication corresponds to the first tenant;

storing a first decrypted communication corresponding to the first encrypted communication at a first public cloud storage resource, wherein the first public cloud storage resource corresponds to the first tenant, and wherein the first decrypted communication is re-encrypted using an encryption native to the document management system; and providing a first reference to the first decrypted communication at the first public cloud storage resource to the document management system.

3. The method of claim 2, further comprising:

selecting a first compute instance container from a plurality of compute instance container based on the first tenant; and decrypting, at the first compute instance container, the first encrypted communication based on first permissions of the first tenant to generate the first decrypted communication.

4. The method of claim 2, wherein receiving the first encrypted communication further comprises:

receiving a notification of delivery of a first communication from a first remote device; and in response to receiving the notification, initiating a device session between the entitlement router and the first remote device.

5. The method of claim 4, wherein initiating the device session between the entitlement router and the first remote device further comprises:

generating a temporary key for encrypting the first communication; and transmitting the temporary key to the first remote device.

6. The method of claim 5, wherein generating the temporary key for encrypting the first communication further comprises:

generating a public key for encrypting the first communication to generate the first encrypted communication; and generating a private key for decrypting the first encrypted communication.

7. The method of claim 5, wherein generating the temporary key for encrypting the first communication further comprises:

retrieving a public key corresponding to the first remote device;

encrypting the temporary key using the public key to generate an encrypted temporary key; and transmitting the encrypted temporary key to the first remote device, wherein the encrypted temporary key is decryptable using a private key corresponding to the first remote device.

8. The method of claim 2, further comprising:

calling the upload service application programming interface of the document management system; and receiving the routing logic in response to calling the upload service application programming interface.

9. The method of claim 2, wherein processing the first encrypted communication using the routing logic further comprises:

determining, by the routing logic, a tenant identifier transmitted with the first encrypted communication; and determining to direct the first encrypted communication to the entitlement router based on the tenant identifier.

10. The method of claim 9, wherein processing, at the entitlement router, the first communication to determine that the first communication corresponds to the first tenant further comprises:

comparing the tenant identifier to a plurality of tenant identifiers; and selecting the first tenant based on comparing the tenant identifier to the plurality of tenant identifiers.

11. The method of claim 2, further comprising:

receiving, from a second remote device, a request to access the first decrypted communication using the first reference; and in response to receiving the request, determining whether the second remote device corresponds to the first tenant.

12. The method of claim 11, wherein determining whether the second remote device corresponds to the first tenant further comprises:

receiving a tenant identifier in the request; and determining that the tenant identifier corresponds to the first tenant.

13. The method of claim 12, further comprising:

in response to determining that the second remote device corresponds to the first tenant, removing the encryption native to the document management system;

generating a second encrypted communication, based on the first decrypted communication, using a second ephemeral key for the first tenant; and transmitting the second encrypted communication to the second remote device.

14. One or more non-transitory, computer-readable mediums, comprising instructions that, when executed by one or more processors, cause operations comprising:

receiving a first encrypted communication;

processing, using a routing logic, the first communication by directing the first encrypted communication to an entitlement router, wherein the routing logic comprises a rule set for ingesting communications into a document management system;

processing, at the entitlement router, the first communication to determine that the first encrypted communication corresponds to a first tenant;

decrypting the first encrypted communication based on first permissions of the first tenant to generate a first decrypted communication;

storing a first decrypted communication corresponding to the first encrypted communication at a first public cloud storage resource, wherein the first public cloud storage resource corresponds to the first tenant, and wherein the first decrypted communication is re-encrypted using an encryption native to the document management system; and providing a first reference to the first decrypted communication at the first public cloud storage resource to the document management system.

15. The one or more non-transitory, computer-readable mediums of claim 14, wherein the operations further comprise:

selecting a first compute instance container from a plurality of compute instance container based on the first tenant; and decrypting, at the first compute instance container, the first encrypted communication based on first permissions of the first tenant to generate the first decrypted communication.

16. The one or more non-transitory, computer-readable mediums of claim 14, wherein receiving the first encrypted communication further comprises:

receiving a notification of delivery of a first communication from a first remote device; and in response to receiving the notification, initiating a device session between the entitlement router and the first remote device.

17. The one or more non-transitory, computer-readable mediums of claim 16, wherein initiating the device session between the entitlement router and the first remote device further comprises:

generating a temporary key for encrypting the first communication; and transmitting the temporary key to the first remote device.

18. The one or more non-transitory, computer-readable mediums of claim 17, wherein generating the temporary key for encrypting the first communication further comprises:

generating a public key for encrypting the first communication to generate the first encrypted communication; and generating a private key for decrypting the first encrypted communication.

19. The one or more non-transitory, computer-readable mediums of claim 18, wherein generating the temporary key for encrypting the first communication further comprises:

retrieving a public key corresponding to the first remote device;

encrypting the temporary key using the public key to generate an encrypted temporary key; and transmitting the encrypted temporary key to the first remote device, wherein the encrypted temporary key is decryptable using a private key corresponding to the first remote device.

20. The one or more non-transitory, computer-readable mediums of claim 19, further comprising:

calling the upload service application programming interface of the document management system; and receiving the routing logic in response to calling the upload service application programming interface.

* * * * *